United States Patent [19]
Perry et al.

[11] Patent Number: 5,205,715
[45] Date of Patent: Apr. 27, 1993

[54] HELICOPTER ROTOR BLADES

[75] Inventors: Frederick J. Perry; Nicholas C. G. Isaacs, both of Yeovil; Alan Brocklehurst, Sherborne, all of England

[73] Assignee: Westland Helicopters, Ltd., England

[21] Appl. No.: 774,331

[22] Filed: Oct. 10, 1991

[30] Foreign Application Priority Data

Oct. 13, 1990 [GB] United Kingdom ............... 9022271

[51] Int. Cl.$^5$ .............................................. B64C 27/46
[52] U.S. Cl. .................................. 416/228; 416/236 R
[58] Field of Search ............... 416/228, 235, 236 R, 416/236 A, 237; 415/914; 244/198, 199, 200

[56] References Cited

U.S. PATENT DOCUMENTS

| 1,758,560 | 5/1930 | Currie | 416/236 R |
| 2,359,466 | 10/1944 | Currie | 416/236 R |
| 4,455,045 | 6/1984 | Wheeler | |
| 4,655,419 | 4/1987 | van der Hoeven | |
| 4,913,381 | 4/1990 | Mabey | 416/235 |

FOREIGN PATENT DOCUMENTS

| 2634837 | 1/1978 | Fed. Rep. of Germany | 416/236 A |
| 2634851 | 2/1978 | Fed. Rep. of Germany | 416/236 A |
| 910191 | 5/1946 | France | 416/228 |
| 249265 | 7/1926 | Italy | 416/236 A |
| 720600 | 12/1954 | United Kingdom | 416/226 |
| 1538055 | 1/1979 | United Kingdom | |

Primary Examiner—Edward K. Look
Assistant Examiner—James A. Larson
Attorney, Agent, or Firm—Larson & Taylor

[57] ABSTRACT

Flow separation behind the notch region of a swept tip of a helicopter rotor blade is reduced by a plurality of boundary layer control vanes located adjacent a forwardly swept leading edge portion forming the notch region.

18 Claims, 5 Drawing Sheets

HELICOPTER ROTOR BLADES

BACKGROUND OF THE INVENTION

1. Field of the Invention

This invention relates to helicopter rotor blades and is particularly concerned with rotor blades of the construction disclosed in GB-A-1538055.

2. Description of the Prior Art

Rotor blades according to GB-A-1538055 are characterised by a swept tip portion which in plan has a forwardly swept leading edge portion, a rearwardly swept leading edge portion, a rearwardly swept extreme tip edge and a rearwardly swept trailing edge. Such rotor blades have proved highly successful in producing large increases in the allowable rotor operating envelope, and were a significant factor in the establishment of the world absolute speed record for helicopters of 249.10 mph (400.81 km/hr) set by a Westland Lynx helicopter in 1986.

In continuing efforts to improve helicopter performance, wind tunnel tests of the prior rotor blades revealed an area of separated flow on an upper surface of the blade behind the notch region (i.e. the region where the forwardly swept leading edge portion of the tip joins the leading edge of the blade). The problem occurs at high angles of incidence in a range typically encountered by the retreating blade of a helicopter sustaining rotor, and the size of the separated area increases as incidence is increased.

Prior art means for maintaining attached flow include the vortex generating devices of U.S. Pat. No. 4,655,419 for fixed wing applications and U.S. Pat. No. 4,455,045 for fixed wing and road vehicle applications. In the former the vortex generators comprise upstanding generally planar members positioned near the maximum thickness of the aerofoil and in the latter comprise generally triangular shaped channels located at the trailing edge of a wing. Tests showed that such arrangements were unsuitable for preventing separated flow behind the notch region of a helicopter rotor blade of the construction disclosed in GB-A-1538055.

An objective of this invention is therefore to reduce or eliminate the area of separated flow behind the notch region of a helicopter rotor blade of the construction disclosed in GB-A-1538055.

SUMMARY OF THE INVENTION

Accordingly, in one aspect this invention provides a rotor blade having a leading edge and a trailing edge defining a blade chord, a pitch change axis and a swept tip including a forwardly swept leading edge blended with the blade leading edge to define a notch region, wherein a plurality of rearwardly extending boundary layer control vanes protrude from an upper aerofoil surface of the rotor blade and are spaced-apart along the notch region, the control vanes comprising thin fences extending between leading and trailing edges thereof with the leading edges of at least some of the control vanes substantially coincident with said forwardly swept leading edge.

Preferably said control vanes extending from the forwardly swept leading edge are in planes generally perpendicular to said pitch change axis.

In one embodiment, three control vanes extend rearwardly from said forwardly swept leading edge and two additional rearwardly extending boundary layer control vanes are located inboard of said vanes extending from said forwardly swept leading edge. Preferably said additional control vanes are located in planes at an angle to a plane perpendicular to said pitch change axis so as to extend from their leading edges rearwardly and outwardly. The said angle may be about 5 degrees.

The said additional control vanes are preferably staggered rearwardly and spaced-apart from said leading edge of the rotor blade.

Preferably, the leading and trailing edges of the control vanes extend generally perpendicular with respect to a local blade chord line, and said control vanes may protrude from said aerofoil surface in planes generally perpendicular to a spanwise plane through the blade chord. The heights of the control vanes may be between 1.5 and 2 times the thickness of the boundary layer operative on an adjacent surface of the rotor blade and may increase rearwardly from the control vane leading edge. In one embodiment, the height of the control vanes extending from said forwardly swept leading edge increases from a height equivalent to about 0.22 per cent blade chord adjacent their leading edges to a height equivalent to about 0.88 per cent blade chord adjacent their trailing edges, and the height of the additional inboard control vanes increases from a height equivalent to about 0.37 per cent blade chord adjacent their leading edges to a height equivalent to about 1.47 per cent blade chord adjacent their trailing edges.

The lengths of all of the control vanes may be substantially equal and may be between 5 and 40 per cent of the blade chord dimension. In one embodiment the lengths of the control vanes are equivalent to about 20 per cent of the blade chord dimension.

The control vanes may be attached to the blade aerofoil surface using fillets of bonding material at the blade/control vane junction. Preferably the fillets have a small concave radius and a height not more than about one half the height of the respective control vane.

BRIEF DESCRIPTION OF THE DRAWINGS

The invention will now be described by way of example only and with reference to the accompanying drawings in which.

DETAILED DESCRIPTION OF THE DRAWINGS

Figure 1:
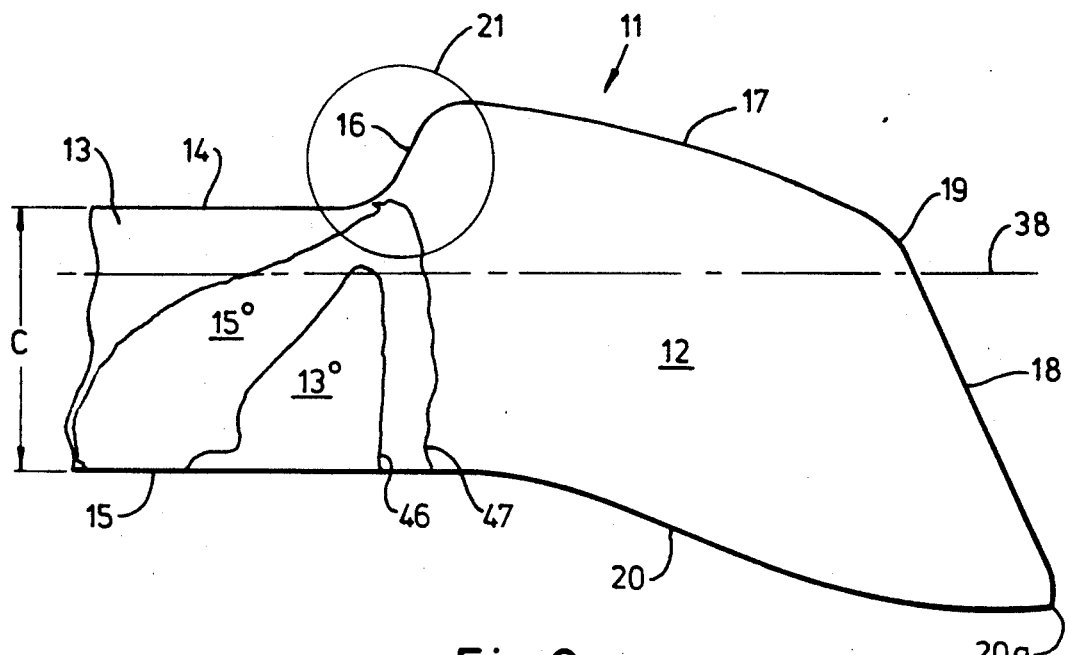
FIG. 1 is a fragmentary plan view of a helicopter rotor blade according to the prior art.

Referring now to FIG. 1, a helicopter sustaining rotor blade generally indicated at 11 of the construction disclosed in GB-A-1538055 includes a swept tip 12 attached at the end of a central portion 13 of aerofoil section and having a leading edge 14 and a trailing edge 15 defining a blade chord dimension 'C'. In operation, pitch changes occur about a pitch change axis 38 extending longitudinally along the blade at about 25 percent chord.

Swept tip 12 includes a forwardly swept leading edge portion 16 blended with the leading edge 14, a curved rearwardly extending leading edge portion 17 and a swept extreme tip edge 18 blended with leading edge portion 17 by a blend radius portion 19. A curved rearwardly swept trailing edge 20 blends with trailing edge 15 and extends to join the end of swept tip edge 18 at point 20a to complete the shape of the swept tip 12. Point 20a defines in operation the overall length of the rotor blade 11.

The area of the tip 12 encompassing the forwardly swept leading edge portion 16 and identified within the area 21 on FIG. 1 has become known as the notch region of such rotor blades and will be so referenced in the remainder of this specification.

Wind tunnel tests of the blade of FIG. 1 as a non-rotating wing at a Reynolds Number of $0.6 \times 10^6$ and intended to represent a retreating blade revealed an area of separated flow emanating forward from the trailing edge 15 behind the notch region 21 at high angles of attack or incidence. The area of separated flow first appeared at an incidence of about 9 degrees as a small "kidney" shaped area at the trailing edge 15.

As incidence was increased, the area of separated flow also grew, becoming more triangular in shape by spreading inboard along the trailing edge 15 while the apex moved forwardly from the trailing edge 15 along the upper aerofoil surface of the blade. As identified at 46 in FIG. 1, at an angle of incidence of 13 degrees, the generally triangular shaped area of separated flow has a base length of about 0.75 C and has spread forward by a similar amount. At an angle of incidence of 15 degrees the area of separated flow identified at 47 in FIG. 1 actually reaches the leading edge of the blade 11 in the notch region 21 and its base has increased to a length equivalent to about 1.35 C.

The range of incidence angles over which significant areas of separated flow are apparent is within a range of angles typically encountered by the retreating blade on a helicopter sustaining rotor, and it was considered that eliminating or reducing the area of separated flow within this range of angles could yield a useful improvement in performance and delay an undesirable increase in flight control loads.

Figure 9:
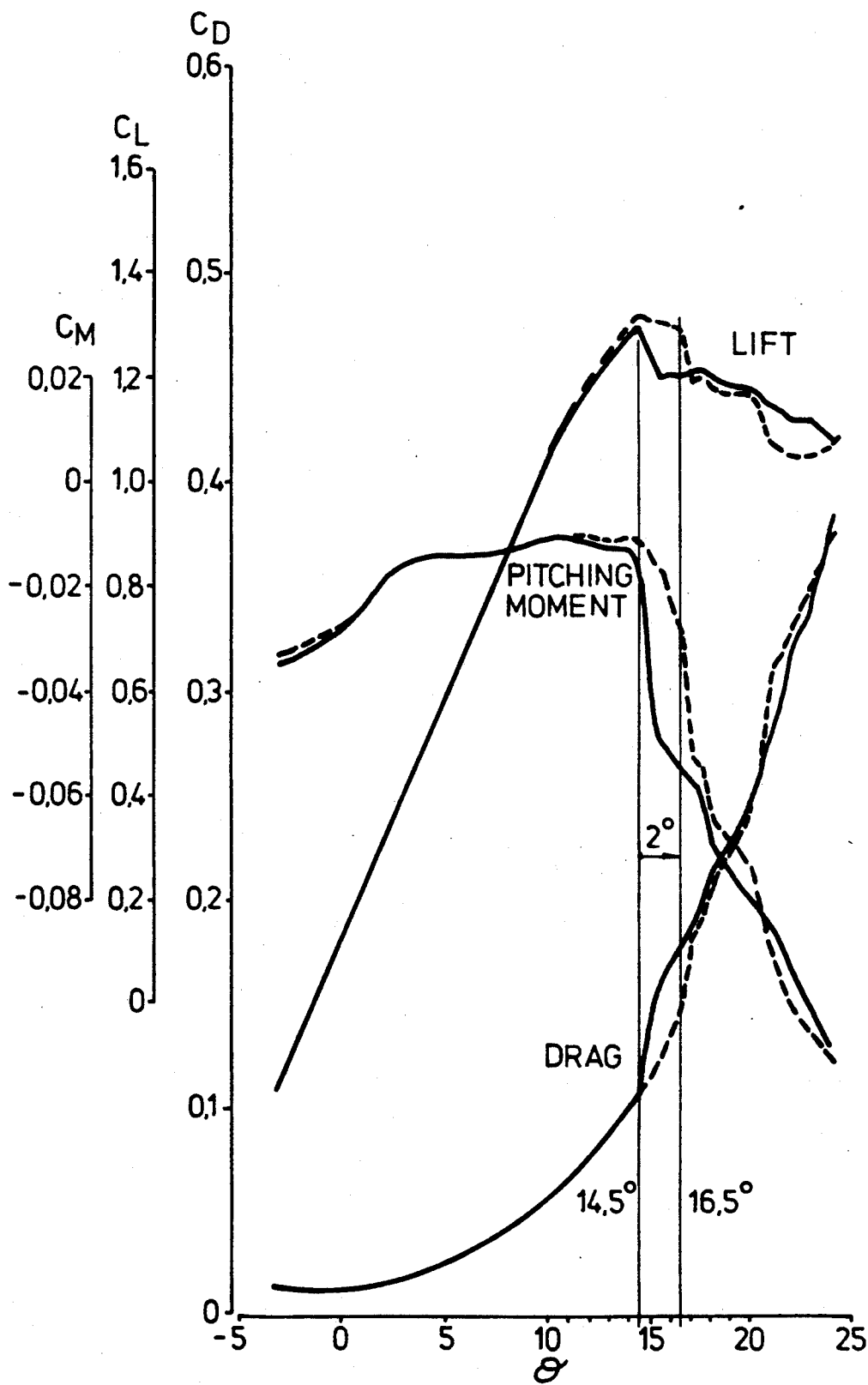
FIG. 9 is a graph plotting rotor blade characteristics against angle of incidence.

The consequences of the onset of separated flow are illustrated in the graph of FIG. 9 which plots drag coefficient ($C_D$), lift coefficient ($C_L$) and pitching moment coefficient ($C_M$) against incidence ($\theta$), and shows the characteristics of the prior art rotor blade in full line. Thus, at an incidence angle of about 14.5 degrees as the area of separated flow approaches the leading edge of the aerofoil (FIG. 1), the prior art rotor blade exhibits a sharp loss of lift and pitching moment, and a sharp increase in drag, all clearly representative of a stall condition.

In investigating solutions to this problem, the inventors considered the use of vortex generators similar to those used on the upper surface of the wings of fixed wing aircraft to mix high momentum fluid particles outside the boundary layer with the retarded boundary layer at the surface thus avoiding or delaying the onset of separated flow.

An example of prior art vortex generators for fixed wings is disclosed in U.S. Pat. No. 4,655,419 and, as is general in the art, the vortex generators are positioned near the maximum thickness location of the aerofoil typically at about 30% chord or perhaps further aft. Another example is disclosed in U.S. Pat. No. 4,455,045 which teaches the use of generally triangular shaped channels located at the trailing edge of a wing for maintaining attached flow.

A variety of such conventional style vortex generators were tested in the wind tunnel at the suggested locations but on a helicopter rotor blade of the construction disclosed in GB-A-1538055 and it was found that the flow separation behind the notch region could not be prevented by such devices at high incidence. The inventors discovered that the further forward the vortex generators were moved the larger the incidence to which flow separation could be suppressed, however, because of very high velocities present at the leading edge of the tip of a helicopter rotor blade, the prior art generators gave very high drag loads. This represented a severe problem especially for operation at high Mach numbers.

Figure 2:
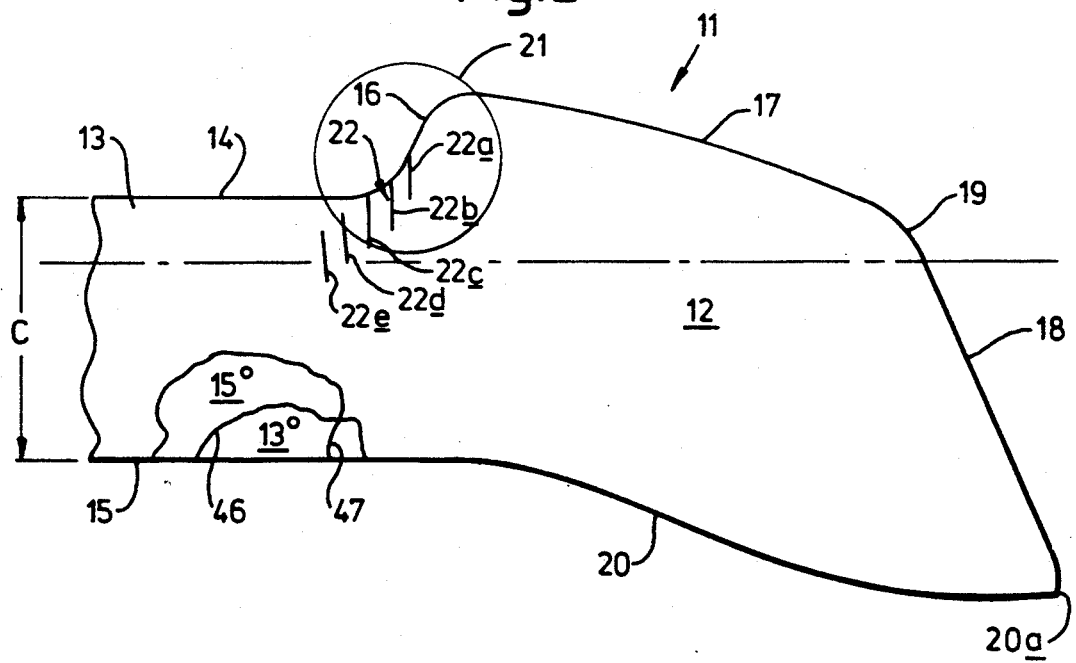
FIG. 2 is a fragmentary plan view of a helicopter rotor blade constructed according to one embodiment of this invention.

To solve these problems the inventors nevertheless considered that a plurality of specially configured boundary layer control vanes 22 located in the notch region 21 on an upper surface of the rotor blade 11, might be useful in delaying the onset of flow separation, and a preferred arrangement is illustrated in FIG. 2. Thus, five boundary layer control vanes 22 protrude from the blade surface and are spaced-apart along the length of the notch region 21, the three outer control vanes 22a, 22b and 22c extending rearwardly from a leading edge located substantially coincident with the forwardly swept leading edge 16 of the tip 12 of rotor blade 11. The remaining two inboard control vanes 22d and 22e extend rearwardly from leading edges spaced-apart slightly from the blade leading edge 15 and staggered rearwardly.

The arrangement of the five control vanes 22 and their particular configurations will be described hereinafter in more detail.

Wind tunnel testing of the rotor blade of FIG. 2 showed that the boundary layer control vanes 22 were extremely effective in suppressing the spread of flow separation and delaying stalling of the blade. As shown in FIG. 2, the area 46 of separated flow is almost completely eliminated at an incidence of 13 degrees, and the area 47 of separated flow at an incidence of 15 degrees is drastically reduced from that effective on the blade of FIG. 1. Thus, the area 47 of separated flow effective at 15 degrees incidence in the blade of FIG. 2 extends forward from the blade trailing edge by an amount equal to about 0.37 C and has a base length of only about 0.62 C.

The result of this considerable reduction in the area of flow separation at high incidence is shown in FIG. 9 in which the characteristics of a rotor blade according to this invention are shown in broken line. Thus, the breaks in the lift and drag curves are delayed and a more gradual divergence of the pitching moment is evident.

Beyond an angle of incidence for maximum lift of the particular blade the drag divergence is delayed until an angle of 16.5 degrees and at this angle, which is 2 degrees higher than that for the prior art blade, the lift also falls back approximately to the post stall values of the prior art blade.

The delay in drag divergence provides a reduction in the power required by the rotor blade of this invention and the delay in pitching moment break will delay control load growth in forward flight at the retreating blade limits. Performance also is enhanced at high incidence by the delay in the loss of lift.

Figure 10:
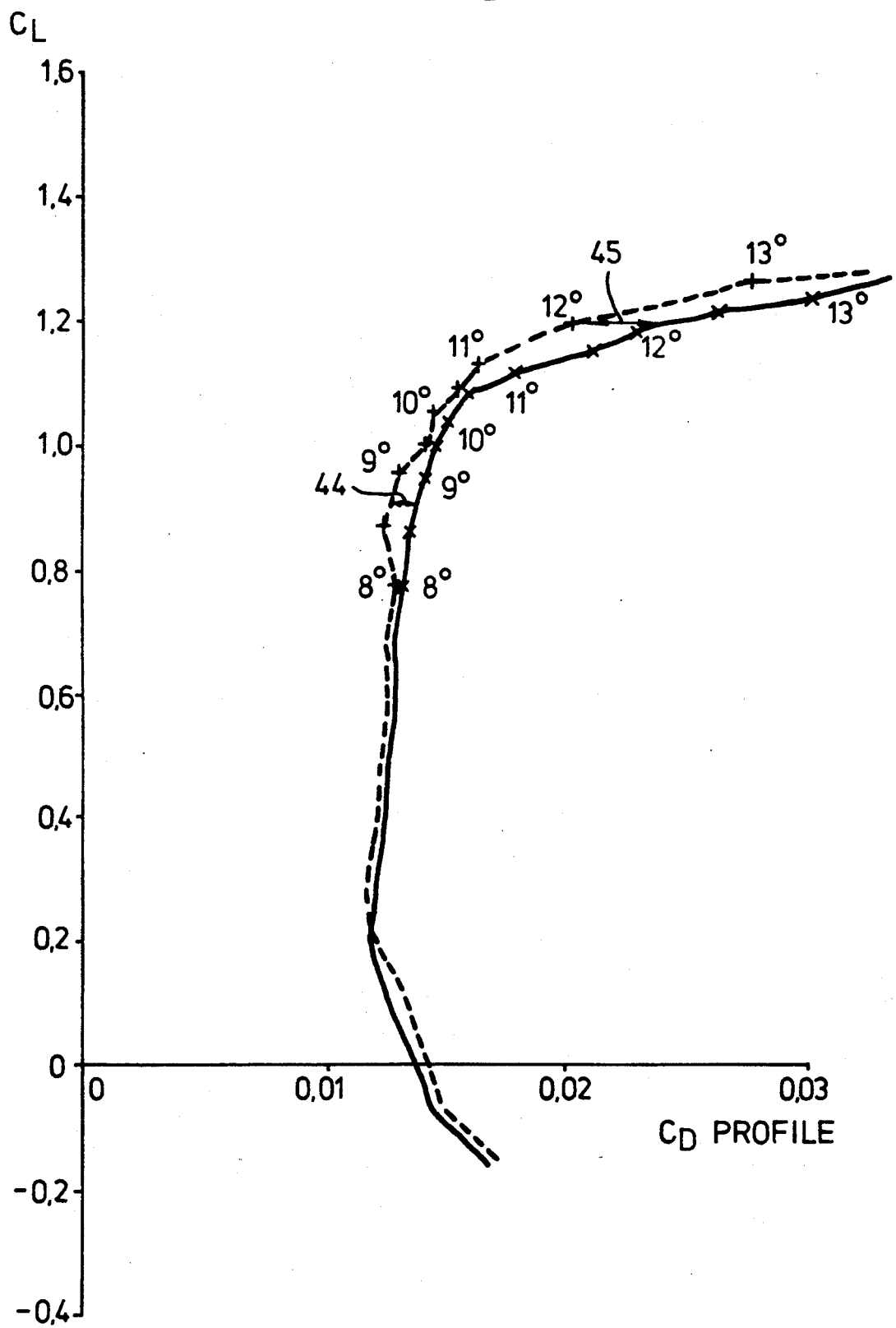
FIG. 10 is a graph plotting rotor blade lift against profile drag.

FIG. 10 plots lift coefficient ($C_L$) against profile drag coefficient ($C_D$) to illustrate more clearly the characteristics of a blade according to the invention at lower angles of incidence than those considered in obtaining the data from which FIGS. 1 and 2 derive. As before, the characteristics of the blade of the invention are shown in broken line. It will be noted that at low lift the blade of the invention exhibits a small increase in profile drag. However, at a moderate lift coefficient of about 0.9 there is a useful reduction in profile drag as indicated at 44. As shown this is representative of an angle of incidence between eight and nine degrees.

At high lift, represented, say, by a lift coefficient of 1.2, the reduction in profile drag has increased to that indicated at 45 in FIG. 10, and is representative of an angle of incidence of about twelve degrees.

Features of the five boundary layer control vanes 22 of the illustrated embodiment and their location in notch region 21 will now be described with reference to FIGS. 3 to 8 inclusive. The control vanes 22 protrude from the upper aerofoil surface and are equally spaced-apart along the length of the notch region 21. The control vanes 22 comprise thin fences about 1 mm thick extending substantially rearwardly between generally upstanding leading and trailing edges identified respectively by numerals 23 to 27 inclusive and 28 to 32 inclusive.

The control vanes 22a to 22e are of substantially uniform length 33 equal to about 20 percent C, and increase in height from the leading edges 23 to 27. Preferably, the height of the control vanes is chosen to be slightly greater than the thickness of the boundary layer experienced on the adjacent surface of the blade during operation and, typically, will be between about 1.5 and 2 times the thickness. In the illustrated embodiment, each of the three control vanes 22a, 22b and 22c extending from leading edges 23, 24 and 25 coincident with the forwardly swept leading edge portion 10 have a height 34 equivalent to about 0.22 percent C adjacent their leading edges 23 to 25 and a height 35 of about 0.88 percent C adjacent their trailing edges 28, 29, 30. Each of the two inboard control vanes 22d and 22e have a height 36 adjacent their leading edges 26, 27 equivalent to about 0.37 percent C and a height 37 adjacent their trailing edges 31 and 32 equivalent to about 1.47 percent C.

Figure 3:
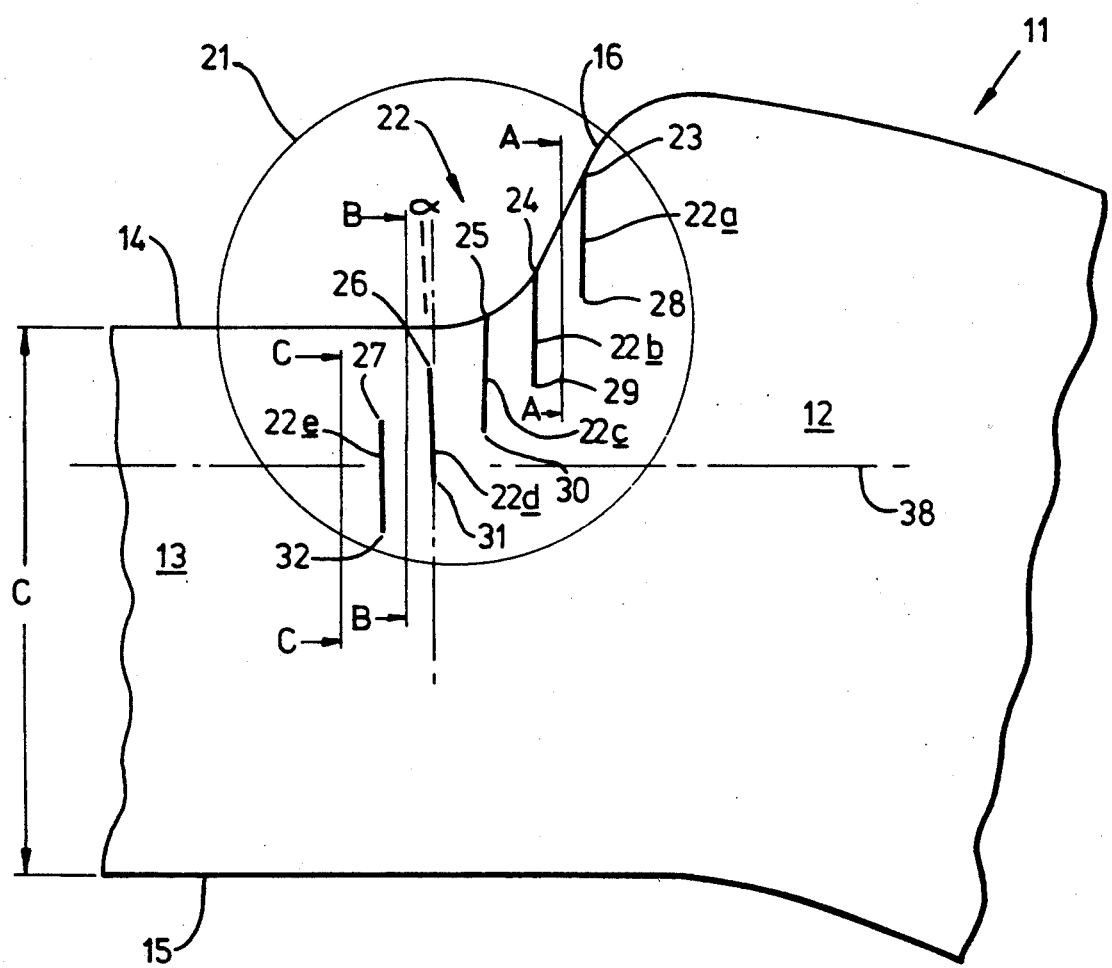
FIG. 3 is a fragmentary plan view of part of the rotor blade of FIG. 2 on an enlarged scale.
Figure 4:
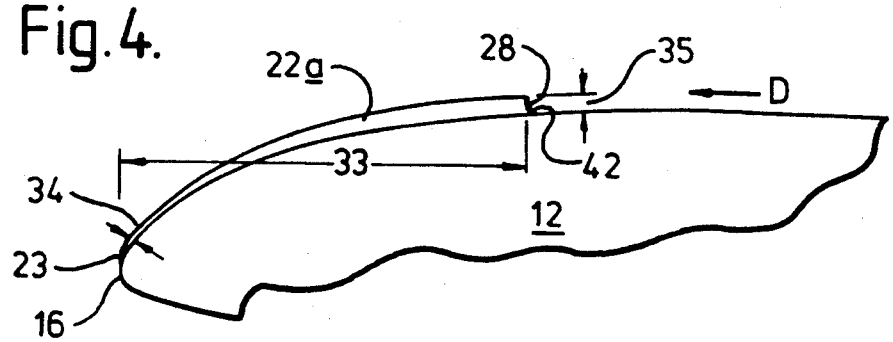
FIG. 4 is a sectioned view taken on lines A—A of FIG. 3.
Figure 5:
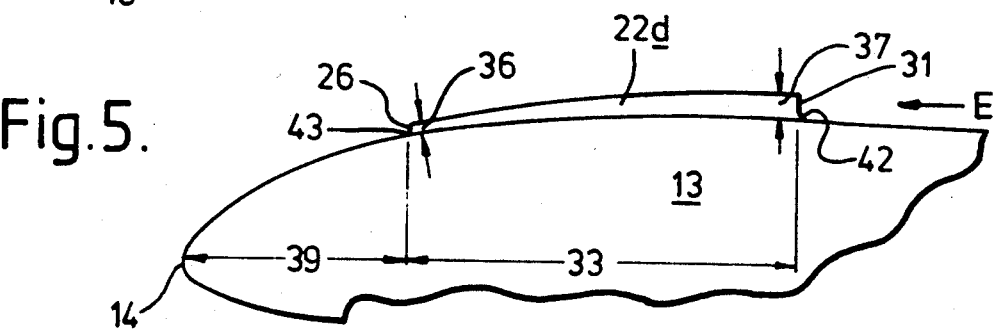
FIG. 5 is a sectioned view taken on lines B—B of FIG. 3.
Figure 6:
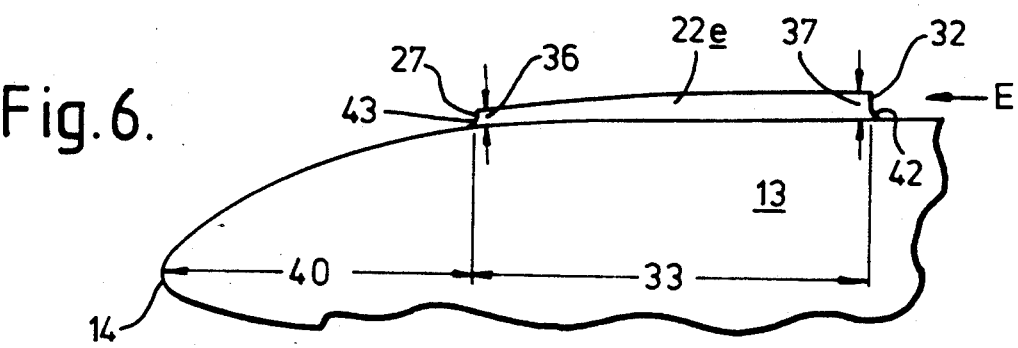
FIG. 6 is a sectioned view taken on lines C—C of FIG. 3.

FIG. 4 is typical for all three of the outboard control vanes 22a, 22b and 22c and shows that the leading edges 23, 24 and 25 of those vanes extend generally perpendicular with respect to a local blade chord line from a position substantially coincident with the forwardly swept leading edge portion 16 of the notch region 21. The vanes 22a, 22b and 22c extend rearwardly from the leading edges 23, 24 and 25 in planes generally perpendicular to a reference axis comprising pitch change axis 38, i.e. streamwise as shown in FIG. 3. Inboard control vanes 22d and 22e are staggered rearwardly and extend respectively from leading edge 26 located at a distance 39 equal to about 10 percent C from leading edge 14 of the blade (FIG. 5), and from leading edge 27 located at a distance 40 equal to about 15 percent C from leading edge 14 (FIG. 6). Additionally, in the illustrated embodiment, the two inboard control vanes 22d and 22e are each located in planes at a small angle $\alpha$ of about 5 degrees to a plane perpendicular to the reference axis 38 as shown in FIG. 3 so as to extend from the respective leading edges 26 and 27 rearwardly and outwardly.

In the illustrated embodiment the control vanes 22 protrude from the upper aerofoil surface in planes generally perpendicular to a spanwise plane through the blade chord (FIGS. 7 and 8) and are attached using fillets 41 of bonding material along the control vane/blade junction. The tests showed that the performance of the control vanes 22 was sensitive to the configuration of the fillets 41 and, for example, triangular fillets were found to be detrimental to performance of the control vanes.

Figure 7:
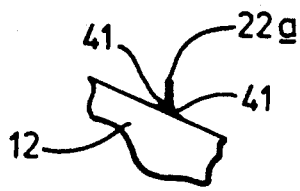
FIG. 7 is a fragmentary end view taken on arrow D of FIG. 4.
Figure 8:
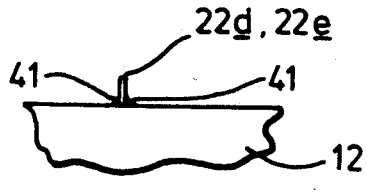
FIG. 8 is a fragmentary end view taken on arrow E on FIG. 6.

Best results were obtained using fillets 41 having a small concave radius as illustrated in FIGS. 7 and 8. The tests showed that the height of the fillets 41 should be not more than about one half the height of the respective control vane 22 and must be reduced in height towards the control vane leading edge to correspond with the reduced height of the control vanes 22. For the three outboard control vanes 22a, 22b and 22c which are mounted on a sloping upper aerofoil surface of the notch region 21 of the blade due to changing thickness of the aerofoil section in that region, the fillets 41 on the "inner" junction need to be carefully made to ensure that a clear vertical surface of the control vane remains above an upper edge of the fillet 41.

The tests also showed that the trailing edges 28 to 32 inclusive of the control vanes 22 should preferably extend generally perpendicular with respect to a local blade chord line in order to provide an advantageous substantially right angle corner with the upper surfaces of the vanes 22. In the illustrated embodiment a small concave radius fillet 42 of bonding material (FIGS. 3, 4 and 5) is required at the base, and the edges of the fillets 42 are best removed or faired to minimise the rear facing area. Fillets 43 at the leading edges of control vanes 22d and 22e are similarly faired as are the leading edges 23, 24 and 25 of the outer three control vanes 22a, 22b and 22c. This fairing of the leading and trailing edges of the control vanes 22 reduces aerodynamic drag.

In operation, the location of the boundary layer control vanes 22 of this invention in the leading edge region of the rotor blade generates small streamwise vortices which re-energise and stabilise the boundary layer thereby suppressing or delaying the onset of flow separation at the trailing edge of the blade. Particular features of the invention are that the control vanes 22 are located at or adjacent the leading edge of the rotor blade, that the three outer control vanes 22a, 22b and 22c extend in planes streamwise or perpendicular to the reference axis 38 from a leading edge 23, 24 and 25 generally coincident with the forwardly swept leading edge portion 16 of notch region 21, and that the two inboard control vanes 22d and 22e extend in planes at a small angle to a plane perpendicular to reference axis 38. The outer three control vanes 22a, 22b and 22c have negligible effect at low incidence. However as incidence increases the airflow is naturally at an angle to the control vanes due to the forwardly swept leading edge portion 16, which causes the control vanes to gradually "switch on" and create the streamwise or longitudinal vortices which persist towards the trailing edge to suppress the area of local flow separation as hereinbefore described. In this respect the boundary layer control vanes 22 differ from the usual prior art vortex generators in that they use changes in overall flow direction associated with the general flow over the rotor blade to become effective and intrude into the flow only when required to suppress separation. The angular location of the two inboard vanes 22d and 22e resulted in some further suppression of the inboard extent of the flow separation in the particular application tested.

Whilst FIGS. 1 and 2 show respective areas of flow separation at high angles of incidence, FIG. 10 shows that the area of flow separation is completely eliminated by the control vanes 22 at angles of incidence lower than those in respect of which the data of FIGS. 1 and 2 was obtained.

Initially, the boundary layer control vanes 22 of this invention were envisaged only as a cure for the flow separation problem encountered at high angles of incidence on the retreating blade of a helicopter rotor. However, the tests also showed that they are effective in suppressing flow separation at side slip angles representative of a rotor blade at the rear of the rotor disc, and it is believed that they will also be effective at other azimuth angles.

With regard to the advancing blade where angles of incidence are low and the Mach number is high, the control vanes 22 of this invention are "non-intrusive" in that they do not significantly affect the contour of the aerofoil section and, therefore, have negligible interaction with any weak shock wave occurring in the compressible flow found on the advancing blade. This is because the vortices stemming from the control vanes 22 in this flow region will be weak due to the low angle of incidence and lack of sideslip on the advancing blade, so that the shock/boundary layer interaction should not be affected.

Whilst one embodiment has been described and illustrated it will be understood that many modifications may be made without departing from the scope of the invention as defined in the appended claims. For example, the detail features and number of the boundary layer control vanes 22 can be varied depending on the particular features of the notch region of the rotor blade on which they are fitted. Thus, the control vanes 22 may be spaced-apart at varying dimensions instead of the equal spacing of the described embodiment. The chordwise locations and angle settings of the inboard control vanes 22d and 22e can be varied to fine tune their effect or adapt them for other applications and, in some cases, they may not be necessary. Similarly, the length of the control vanes will vary although it is considered that the length will be between 5 percent and 40 percent of the blade chord C. Any suitable material such as metal or composite material or combinations of such materials may be used for manufacture of the control vanes 22, and the control vanes 22 may be formed integral with the rotor blade. The fillets 41, 42 and 43 are required only if the application of the invention requires their structural support as a means of attachment as may, for example, be the case in resisting the centrifugal loads effective on a helicopter rotor blade.

What is claimed is:

1. A helicopter rotor blade having a leading edge and a trailing edge defining a blade chord, a pitch change axis, a swept tip including a forwardly swept leading edge blended with the blade leading edge to define a notch region, and a plurality of rearwardly extending boundary layer control vanes protruding from an upper aerofoil surface of the rotor blade and spaced-apart along the notch region, the control vanes comprising thin fences extending between leading and trailing edges thereof with the leading edges of at least some of the control vanes substantially coincident with said forwardly swept leading edge, and the lengths of the control vanes being between 5 percent and 40 percent of the blade chord dimension.

2. A rotor blade as claimed in claim 1, wherein the control vanes extending from said forwardly swept leading edge are in planes generally perpendicular to said pitch change axis.

3. A rotor blade as claimed in claim 1 wherein three control vanes extend rearwardly from said forwardly swept leading edge.

4. A rotor blade as claimed in claim 1, wherein the leading edges and trailing edges of the control vanes extend generally perpendicular with respect to a local blade chord line.

5. A rotor blade as claimed in claim 1, wherein said control vanes protrude from said upper aerofoil surface in planes generally perpendicular to a spanwise plane through the blade chord.

6. A rotor blade as claimed in claim 1, wherein the height of each control vane is between 1.5 and 2 times the thickness of the boundary layer operative during operation on an adjacent surface of the rotor blade.

7. A rotor blade as claimed in claim 1, wherein the height of each control vane increases rearwardly from the control vane leading edge.

8. A rotor blade as claimed in claim 7, wherein the height of each control vane extending from said forwardly swept leading edge increases from a height equivalent to about 0.22 per cent blade chord adjacent its leading edge to a height equivalent to about 0.88 per cent blade chord adjacent its trailing edge.

9. A rotor blade as claimed in claim 1 wherein the lengths of all the control vanes are substantially equal.

10. A rotor blade as claimed in claim 1, wherein the length of each control vane is equivalent to about 20 per cent of the blade chord dimension.

11. A rotor blade as claimed claim 1, wherein the control vanes are attached to the blade aerofoil surface using fillets of bonding material at the blade/control vane junction.

12. A rotor blade as claimed in claim 11 wherein said fillets have a concave radius and a height not more than about one half the height of the respective control vane.

13. A helicopter rotor blade having a leading edge and a trailing edge defining a blade chord, a pitch change axis, a swept tip including a forwardly swept leading edge blended with the blade leading edge to define a notch region, and a plurality of rearwardly extending boundary layer control vanes comprising thin fences protruding from an upper aerofoil surface of the rotor blade and extending between leading and trailing edges, wherein a plurality of said control vanes are located in planes generally perpendicular to said pitch change axis and spaced-apart along the notch region with the leading edges of at lest some of said control vanes substantially coincident with said forwardly swept leading edge, and at least two additional boundary layer control vanes are located inboard of said control vanes extending from said forwardly swept leading edge.

14. A rotor blade as claimed in claim 13 wherein said additional control vanes are located in planes at an angle to a plane perpendicular to said pitch change axis so as to extend from their leading edges rearwardly and outwardly.

15. A rotor blade as claimed in claim 14, wherein said angle is about 5 degrees.

16. A rotor blade as claimed in claim 14 wherein said additional control vanes are staggered rearwardly and are spaced-apart from the leading edge of the rotor blade.

17. A rotor blade as claimed in claim 13 wherein the height of each additional control vane increases rearwardly from the control vane leading edge.

18. A rotor blade as claimed in claim 17 wherein the height of each additional inboard control vane increases from a height equivalent to about 0.37 percent blade chord adjacent its leading edge to a height equivalent to about 1.47 percent chord adjacent its trailing edge.

* * * * *